US012424350B2

(12) United States Patent
Shinomiya et al.

(10) Patent No.: US 12,424,350 B2
(45) Date of Patent: Sep. 23, 2025

(54) COAXIAL CABLE

(71) Applicant: SUMITOMO ELECTRIC INDUSTRIES, LTD., Osaka (JP)

(72) Inventors: Atsuko Shinomiya, Tochigi (JP); Kenichiro Iwama, Tochigi (JP); Motoi Matsuda, Tochigi (JP); Yuji Ochi, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 58 days.

(21) Appl. No.: 18/550,031

(22) PCT Filed: Mar. 15, 2022

(86) PCT No.: PCT/JP2022/011739

§ 371 (c)(1),
(2) Date: Sep. 11, 2023

(87) PCT Pub. No.: WO2022/209876

PCT Pub. Date: Oct. 6, 2022

(65) Prior Publication Data

US 2024/0161945 A1 May 16, 2024

(30) Foreign Application Priority Data

Mar. 31, 2021 (JP) ................................ 2021-061964

(51) Int. Cl.

| | |
|---|---|
| ***H01B 11/18*** | (2006.01) |
| ***H01B 3/44*** | (2006.01) |
| *H01B 1/02* | (2006.01) |

(52) U.S. Cl.
CPC ......... *H01B 11/1808* (2013.01); *H01B 3/441* (2013.01); *H01B 1/026* (2013.01)

(58) Field of Classification Search
CPC .............................. H01B 7/0225; H01B 11/18
See application file for complete search history.

(56) References Cited

U.S. PATENT DOCUMENTS 8,766,096 B2 * 7/2014 Watanabe ............ H01B 13/142 521/140
10,763,012 B2 * 9/2020 Watanabe .......... H01B 11/1808
(Continued)

FOREIGN PATENT DOCUMENTS

GB 2137907 10/1984
JP S61-045512 3/1986
(Continued)

*Primary Examiner* — Chau N Nguyen
(74) *Attorney, Agent, or Firm* — IPUSA, PLLC

(57) ABSTRACT

A coaxial cable includes an inner conductor, an insulation covering the inner conductor, an outer conductor covering the insulation, and a sheath covering the outer conductor. The inner conductor is a compressed conductor including a central element wire and multiple peripheral element wires surrounding the central element wire. The inner conductor has a compressibility of 23.0% or more and 35.0% or less in percentage. The compressibility is calculated from a sectional area S1 and the sectional area S2 of the compressed conductor by Compressibility=[1−S2/S1]. The sectional area S1 is calculated from the outside diameter D of the central element wire and the total number n of the central and peripheral element wires by $S1=n\times\pi\times0.25\times D^2$. The outside diameter of the insulation is 1.25 mm or more and less than 1.75 mm.

12 Claims, 2 Drawing Sheets

(56) References Cited

U.S. PATENT DOCUMENTS

2003/0051897 A1* 3/2003 Blouin ............... H01B 11/1878 174/106 R
2003/0070831 A1* 4/2003 Hudson .................. H01B 7/295 174/113 R
2006/0254792 A1* 11/2006 Kimura ................ H01B 13/016 174/28
2009/0151970 A1 6/2009 Abe et al.
2013/0087361 A1* 4/2013 Kaga ...................... H01B 3/441 174/110 SR
2014/0374155 A1* 12/2014 Tachibana .............. H01R 13/03 29/862
2015/0075840 A1* 3/2015 Yamaguchi ........ H01B 11/1856 174/113 A
2015/0096781 A1* 4/2015 Fichtner ............. H01B 11/1808 29/745
2015/0270032 A1* 9/2015 Kumada .............. H01B 7/0225 174/107
2017/0062096 A1* 3/2017 Koeppendoerfer .......................... H01B 11/1839
2019/0304633 A1 10/2019 Watanabe et al.
2022/0028582 A1* 1/2022 Okamoto ........... H01B 11/1808

FOREIGN PATENT DOCUMENTS

JP 2006-269300 10/2006
JP 2019-175781 10/2019
WO 2007/148685 12/2007

* cited by examiner

COAXIAL CABLE

TECHNICAL FIELD

The present disclosure relates to coaxial cables.

The present application is based upon and claims priority to Japanese Patent Application No. 2021-061964, filed on Mar. 31, 2021, the entire contents of which are incorporated herein by reference.

BACKGROUND ART

Patent Document 1 discloses a shielded cable that includes an inner conductor;

an insulation provided to cover the outer periphery of the inner conductor; and an outer conductor provided to cover the outer periphery of the insulation, wherein the outer conductor includes a first outer conductor formed of a served shield of first element wires helically wound around the outer periphery of the insulation; and a second outer conductor provided to cover the outer periphery of the first outer conductor and formed of a braided shield into which second element wires are braided.

PRIOR ART DOCUMENT

Patent Document

Patent Document 1: Japanese Unexamined Patent Publication Publication No. 2019-175:781

SUMMARY OF THE INVENTION

A coaxial cable according to the present disclosure includes an inner conductor;

an insulation covering the outer periphery of the inner conductor;

an outer conductor covering the outer periphery of the insulation; and a sheath covering the outer periphery of the outer conductor, wherein the inner conductor is a compressed conductor including a central element wire and multiple peripheral element wires surrounding the central element wire, the inner conductor has a compressibility of 23.0% or more and 35.0% or less in percentage, the compressibility being calculated from a sectional area S1 and the sectional area S2 of the compressed conductor, using Eq. (B) below, the sectional area S1 being calculated from the outside diameter D of the central element wire and the total number n of the central element wire and the peripheral element wires, using Eq. (A) below, $$S1 = n \times \pi \times 0.25 \times D^2 \quad \text{(A)}$$

$$\text{Compressibility} = [1 - S2/S1] \quad \text{(B), and}$$

the outside diameter of the insulation is 1.25 mm or more and less than 1.75 mm.

EMBODIMENT OF THE INVENTION

Figure 1:
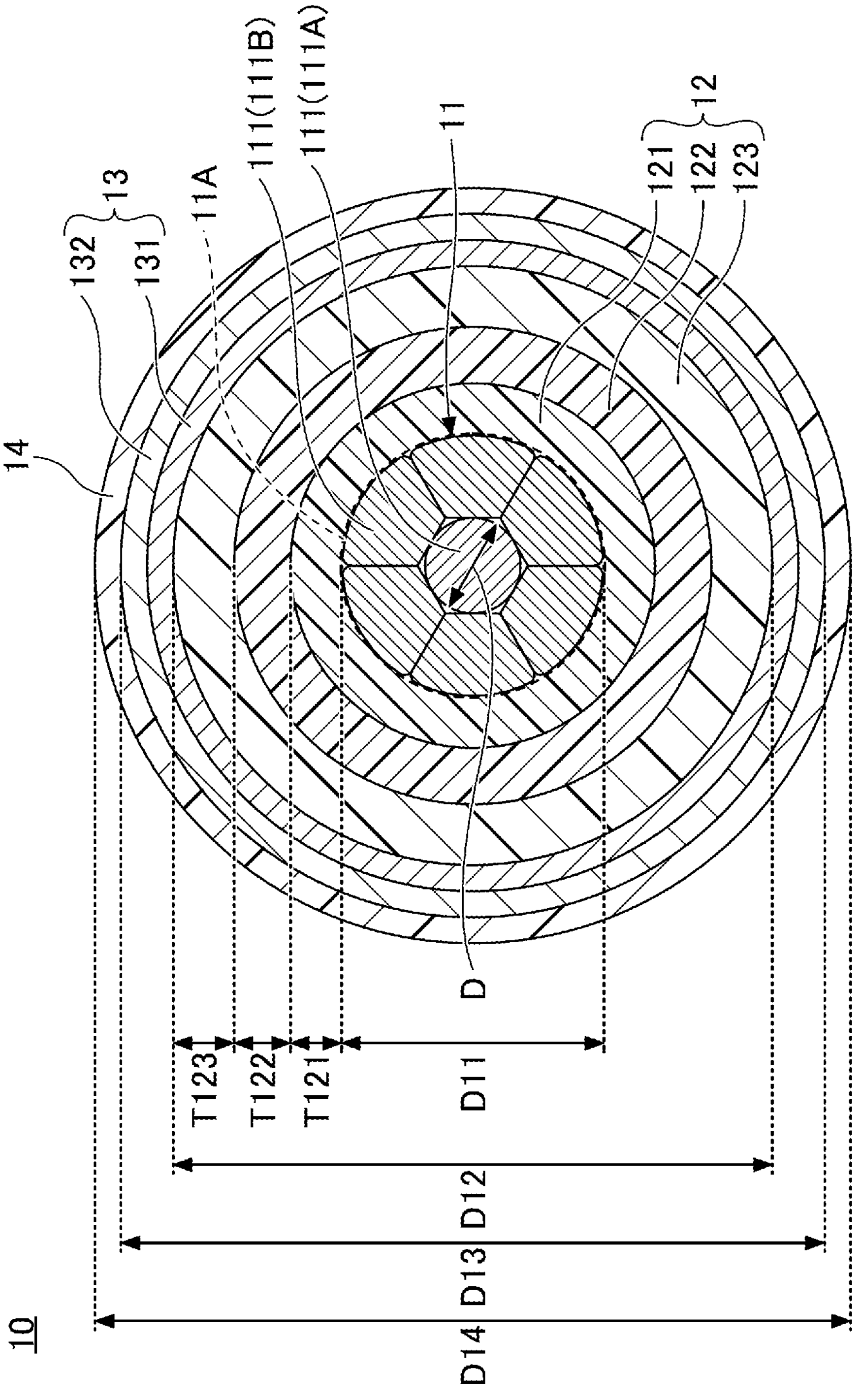
FIG. 1 is a sectional view of a coaxial cable at a surface perpendicular to its longitudinal direction according to an embodiment of the present disclosure.

Problems to be Solved by the Present Disclosure

As disclosed in Patent Document 1, coaxial cables that transmit signals at high speed have been studied.

In recent years, coaxial cables have been required to be higher in transmission speed. According to conventional coaxial cables, however, large attenuation may prevent communications from being performed. Therefore, there is a demand for reduction in attenuation.

Furthermore, coaxial cables may be repeatedly bent, depending on where they are installed or how they are used. Therefore, coaxial cables are also required to have good bending resistance.

Therefore, the present disclosure has an object of providing a coaxial cable whose attenuation is reduced and which has good bending resistance.

Effects of the Present Disclosure

According to the present disclosure, it is possible to provide a coaxial cable whose attenuation is reduced and which has good bending resistance.

Description of Embodiments of the Present Disclosure

First, embodiments of the present disclosure are described in a list. In the following description, the same or corresponding elements are referred to using the same reference character, and the same description is not repeated for them.

(1) A coaxial cable according to an embodiment of the present disclosure includes an inner conductor;

an insulation covering an outer periphery of the inner conductor;

an outer conductor covering an outer periphery of the insulation; and a sheath covering an outer periphery of the outer conductor, wherein the inner conductor is a compressed conductor including a central element wire and multiple peripheral element wires surrounding the central element wire, the inner conductor has a compressibility of 23.0% or more and 35.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1 = n \times \pi \times 0.25 \times D^2 \quad \text{(A)}$$

$$\text{Compressibility} = [1 - S2/S1] \quad \text{(B), and}$$

an outside diameter of the insulation is 1.25 mm or more and less than 1.75 mm.

The inventors of the present invention have studied a coaxial cable whose attenuation is reduced and which has good bending resistance. In the light of increasing bending resistance, it is preferable to use a stranded wire into which multiple conductor element wires are stranded as an inner conductor. In the case of using a conventional stranded wire, however, there is the problem of extremely large attenuation.

Therefore, a coaxial cable according to the present disclosure may use a compressed conductor into which a stranded wire including multiple conductor element wires, namely, a stranded wire into which multiple conductor element wires are stranded, is compressed from the peripheral side.

By compressing a stranded wire including multiple conductor element wires into a compressed conductor, it is possible to provide a coaxial cable that is excellent in bending resistance originating from the stranded wire.

Furthermore, by using a compressed conductor as the inner conductor, it is possible to increase the proportion of a conductor portion (the area occupied only by a conductor portion) in a section of the inner conductor (the area of the circumscribed circle of the inner conductor), namely, a conductor element wire portion, compared with the case of using a stranded wire before being compressed as the inner conductor. Therefore, the use of a compressed conductor as the inner conductor makes it possible to cause the conductor element wires to serve not as individually independent conductors but as a single conductor having a large outside diameter, thus making it possible to reduce conductor loss and also reduce attenuation.

By causing the compressibility of the inner conductor to be 23.0% or more when the outside diameter of the insulation is 1.25 mm or more and less than 1.75 mm, it is possible to sufficiently reduce attenuation with respect to 6.0 GHz signals, particularly for which it is required to reduce attenuation.

Furthermore, by causing the compressibility of the inner conductor to be 35.0% or less, it is possible to increase the productivity of coaxial cables and to easily cause the characteristic impedance of coaxial cables to fall within 50Ω±2Ω.

(2) A coaxial cable according to an embodiment of the present disclosure includes an inner conductor;

- an insulation covering an outer periphery of the inner conductor;
- an outer conductor covering an outer periphery of the insulation; and
- a sheath covering an outer periphery of the outer conductor,
- wherein the inner conductor is a compressed conductor including a central element wire and multiple peripheral element wires surrounding the central element wire,
- the inner conductor has a compressibility of 24.0% or more and 37.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1=n\times\pi\times0.25\times D^2 \quad (A)$$

$$\text{Compressibility}=[1-S2/S1] \quad (B)\text{, and}$$

- an outside diameter of the insulation is 1.75 mm or more and less than 2.25 mm.

By causing the compressibility of the inner conductor to be 24.0% or more when the outside diameter of the insulation is 1.75 mm or more and less than 2.25 mm, it is possible to sufficiently reduce attenuation with respect to 6.0 GHz signals, particularly for which it is required to reduce attenuation.

Furthermore, by causing the compressibility of the inner conductor to be 37.0% or less, it is possible to increase the productivity of coaxial cables and to easily cause the characteristic impedance of coaxial cables to fall within 50Ω±2Ω.

(3) A coaxial cable according to an embodiment of the present disclosure includes an inner conductor;

- an insulation covering an outer periphery of the inner conductor;
- an outer conductor covering an outer periphery of the insulation; and
- a sheath covering an outer periphery of the outer conductor,
- wherein the inner conductor is a compressed conductor including a central element wire and multiple peripheral element wires surrounding the central element wire,
- the inner conductor has a compressibility of 20.0% or more and 33.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1=n\times\pi\times0.25\times D^2 \quad (A)$$

$$\text{Compressibility}=[1-S2/S1] \quad (B)\text{, and}$$

- an outside diameter of the insulation is 2.25 mm or more and 2.80 mm or less.

By causing the compressibility of the inner conductor to be 20.0% or more when the outside diameter of the insulation is 2.25 mm or more and 2.80 mm or less, it is possible to sufficiently reduce attenuation with respect to 6.0 GHz signals, particularly for which it is required to reduce attenuation.

Furthermore, by causing the compressibility of the inner conductor to be 33.0% or less, it is possible to increase the productivity of coaxial cables and to easily cause the characteristic impedance of coaxial cables to fall within 50Ω±2Ω.

(4) The insulation may have one or more and three or less insulation layers.

Inclusion of one or more insulation layers in the insulation facilitates adjustment of the relative permittivity and the thickness of the entire insulation. Therefore, the characteristic impedance of the coaxial cable can be easily adjusted within a desired range. Furthermore, inclusion of three or less insulation layers in the insulation makes it possible to increase the productivity of the coaxial cable.

(5) The insulation may include a foamed polyolefin layer.

Inclusion of a foamed polyolefin layer in the insulation decreases the relative permittivity of the insulation to make it possible to reduce the thickness of the insulation, which is necessary to provide the coaxial cable with a desired characteristic impedance. Therefore, it is possible to reduce the diameter of the coaxial cable, so that it is possible to reduce the weight and increase the ease of handling of the coaxial cable.

(6) The insulation may include a first insulation layer, a second insulation layer, and a third insulation layer in order from the inner conductor side, the film thickness of the second insulation layer may be greater than the film thickness of the first insulation layer and the film thickness of the third insulation layer, and the first insulation layer and the third insulation layer may consist of unfoamed polyolefin, and the second insulation layer may consist of foamed polyolefin.

When the insulation includes the first insulation layer through the third insulation layer, by composing the first insulation layer located on the surface side of the insulation and the third insulation layer only from unfoamed polyolefin, it is possible to prevent the breakage of the insulation due to friction with other members, etc. By composing the second insulation layer, which is located in the middle in the thickness direction of the insulation, only from foamed polyolefin, it is possible to easily control characteristics of the insulation, such as relative permittivity, by adjusting the degree of foaming or the like, for example. By causing the film thickness of the second insulation layer to be greater than the film thickness of the first insulation layer and the film thickness of the third insulation layer, it is possible to increase the effect of the second insulation layer over characteristics of the insulation, such as relative permittivity, and to control characteristics of the insulation with particular ease.

(7) The insulation may have a relative permittivity of 2.4 or less.

As the relative permittivity of a material used for the insulation decreases, the characteristic impedance of the coaxial cable increases. Furthermore, as the thickness of the insulation decreases, the characteristic impedance of the coaxial cable decreases.

The characteristic impedance of the coaxial cable is required to be within 50Ω±2Ω, namely, 48Ω or more and 52Ω or less. By using a material having a relative permittivity of 2.4 or less as a material for the insulation in order to achieve such characteristic impedance, it is possible to easily achieve the required characteristic impedance even when the thickness of the insulation is reduced, that is, the diameter of the coaxial cable is reduced.

Therefore, by using a material having a relative permittivity of 2.4 or less as a material for the insulation, it is also possible to reduce the diameter of the coaxial cable. Accordingly, it is possible to reduce the weight and to increase the ease of handling of the coaxial cable.

(8) The central element wire and the peripheral element wires of the inner conductor may be annealed copper wires, the outer conductor may include a first outer conductor and a second outer conductor in order from the insulation side, and the first outer conductor may be copper-coated polyester tape, and the second outer conductor may be a braided shield of tin-plated annealed copper wires.

Using annealed copper wires as the central element wire and the peripheral element wires of the inner conductor makes it possible to provide a coaxial cable with particularly high reliability and good high-frequency characteristics.

By disposing the above-described members in layers as the first outer conductor and the second outer conductor, a particularly high noise shielding effect can be achieved. That is, it is possible to effectively block the entry of noise from the outside and the exit of noise to the outside in particular.

Details of an Embodiment of the Present Disclosure

A specific example of a coaxial cable according to an embodiment of the present disclosure (hereinafter referred to as "this embodiment") is described below with reference to the drawings. The present invention is not limited to these illustrations, and is shown by the claims with the intention of including meanings equivalent to the claims and all changes within the scope.

(Coaxial Cable)

Figure 2:
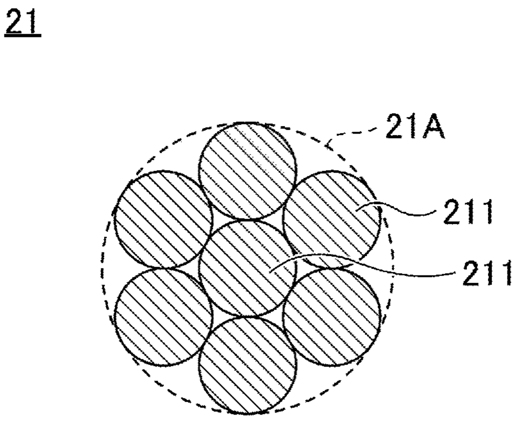
FIG. 2 is a diagram illustrating the pre-compressed state of a stranded wire of an inner conductor of the coaxial cable according to the embodiment of the present disclosure.

FIG. 1 illustrates an example configuration of a section perpendicular to the longitudinal direction of a coaxial cable according to this embodiment. FIG. 2 illustrates a sectional view of a stranded wire before being formed into a compressed conductor. FIGS. 1 and 2 schematically illustrate members in order to describe the configuration of a coaxial cable and the configuration of an inner conductor according to this embodiment. The size, etc., are not limited to the embodiment of FIGS. 1 and 2.

As illustrated in FIG. 1, a coaxial cable 10 according to this embodiment may include an inner conductor 11, an insulation 12 covering the outer periphery of the inner conductor 11, and an outer conductor 13 covering the outer periphery of the insulation 12, and a sheath 14 covering the outer periphery of the outer conductor 13.

Each member is described below.

(1) Inner Conductor (1-1) About Materials

As illustrated in FIG. 1, the inner conductor 11 may include multiple conductor element wires 111. The inner conductor 11 may include, as the conductor element wires 111, a central element wire 111A placed at the center and multiple peripheral element wires 111B placed at the outer periphery of the central element wire 111A in such a manner as to surround the central element wire 111A.

The conductor element wires 111 are stranded into a stranded wire, which is compressed from the peripheral side into a compressed conductor to serve as the inner conductor 11.

Materials for the conductor element wires 111 of the inner conductor 11 are not limited in particular. Annealed copper wires or copper alloy wires may be preferably used and annealed copper wires may be more preferably used as the conductor element wires 111, namely, the central element wire 111A and the peripheral element wires 111B. Using annealed copper wires or copper alloy wires as the conductor element wires 111 makes it possible to provide a coaxial cable with particularly high reliability and good high-frequency characteristics.

Preferably, the surfaces of the conductor element wires 111 are not provided with a coating of plating in view of transmitting high-frequency signals.

(1-2) About Structure

As described above, the inner conductor 11 may be a compressed conductor into which a stranded wire including the conductor element wires 111 are compressed.

The inventors of the present invention have studied a coaxial cable whose attenuation is reduced and which has good bending resistance. In the light of increasing bending resistance, it is preferable to use a stranded wire into which multiple conductor element wires are stranded as the inner conductor 11. In the case of using a conventional stranded wire, however, there is the problem of extremely large attenuation.

Therefore, the coaxial cable 10 according to this embodiment may use a compressed conductor into which a stranded wire including the conductor element wires ill, namely, a stranded wire into which the conductor element wires 111 are stranded, is compressed from the peripheral side.

By compressing a stranded wire including the conductor element wires 111 into a compressed conductor, it is possible to provide a coaxial cable that is excellent in bending resistance originating from the stranded wire.

Here, FIG. 2 is a diagram illustrating a section of a stranded wire 21 into which multiple conductor element wires 211 before being compressed are stranded. The section is perpendicular to the longitudinal direction of the stranded wire 21.

A comparison of the proportion of the area occupied by the conductor element wires 211 in the area of a circumscribed circle 21A of the stranded wire 21 of FIG. 2 and the proportion of the area occupied by the conductor element wires 111 in the area of a circumscribed circle 11A of the inner conductor 11 of FIG. 1 clearly indicates that the proportion of the area occupied by the conductor element wires 111 within the circumscribed circle 11A of the inner conductor 11 is greater. That is, by using a compressed conductor as the inner conductor 11, it is possible to increase the proportion of a conductor portion (the area occupied only by a conductor portion) in a section of the inner conductor 11 (the area of the circumscribed circle of the inner conductor), namely, a conductor element wire portion, compared with the case of using the stranded wire 21 before being compressed as the inner conductor 11. Therefore, the use of a compressed conductor as the inner conductor 11 makes it possible to cause the conductor element wires 111 to serve not as individually independent conductors but as a single conductor having a large outside diameter, thus making it possible to reduce conductor loss and also reduce attenuation.

(1-3) About Compressibility

The compressibility may be calculated, for example, from a sectional area S1 and a sectional area S2 of the compressed conductor, using Eq. (B) below, and be expressed as a percentage. The sectional area S1 is calculated from an outside diameter D of the central element wire 111A and the total number n of the central element wire 111A and the peripheral element wires IIIB, using Eq. (A) below. That is, the value obtained by multiplying the value calculated by Eq. (B) below by 100 may be a compressibility in the case of being expressed as a percentage.

$$S1 = n \times \pi \times 0.25 \times D^2 \quad \text{(A)}$$

$$\text{Compressibility} = [1 - S2/S1] \quad \text{(B)}$$

S1 in Eq. (A) and Eq. (B) is the sectional area of the portion of the conductor element wires 211 in the stranded wire 21 before being formed into a compressed conductor. S2 in Eq. (B) is the sectional area of the portion of the conductor element wires in the compressed conductor.

Accordingly, the compressibility may also be referred to as the rate of decrease of the sectional area of the conductor element wire portion in the case of forming the stranded wire 21 into the inner conductor 11 that is also a compressed conductor.

When S1, which is the sectional area of the portion of the conductor element wires 211 in the stranded wire 21, which is a conductor before being compressed, is known, the compressibility may be calculated from Eq. (B) above. When S1, which is the sectional area of the portion of the conductor element wires 211 in the stranded wire 21, which is a conductor before being compressed, is unknown, the compressibility may be calculated from the sectional shape of the inner conductor 11, which is a compressed conductor, following the procedure below, using Eq. (A).

In the case of the compressibility of the inner conductor 11 in the coaxial cable 10 according to this embodiment, the sectional shape of the central element wire 111A among the conductor element wires 111 of the inner conductor 11 partially maintains a circular shape. Here, the term partially means that a circular shape is maintained as a whole but a part (a part in contact with the peripheral element wires 111B in particular) is crushed because of compression. Therefore, of the widths of the central element wire 111A passing through the center of the section of the central element wire 111A, the largest width may be regarded as the outside diameter D of the central element wire 111A. The sectional area of the central element wire 111A may be calculated from the outside diameter D of the central element wire 111A.

Next, by multiplying the sectional area of the central element wire 111A by the number of the conductor element wires 111, S1, which is the sectional area of the portion of the conductor element wires 211 in the stranded wire 21 before being formed into a compressed conductor, may be calculated. That is, S1 may be calculated by Eq. (A) above. In the case of the coaxial cable 10 illustrated in FIG. 1, the total number n of the central element wire 111A and the peripheral element wires 111B in the inner conductor 11 is seven.

S2, which is the sectional area of the compressed conductor, may be calculated from a section of the coaxial cable perpendicular to its longitudinal direction, using image processing software or the like as needed. That is, the sectional area S2 of the compressed conductor is the area of the net conductor portion excluding an air gap portion.

The compressibility of the inner conductor 11 of the coaxial cable of this embodiment is preferably 20.0% or more and 37.0% or less, and more preferably, 20.5% or more and 36.0% or less.

This is because causing the compressibility of the inner conductor 11 to be 20.0% or more makes it possible to sufficiently reduce attenuation with respect to 6.0 GHz signals, particularly for which it has been recently required to reduce attenuation.

An attempt to excessively increase the compressibility of the inner conductor 11, however, may reduce productivity or make it difficult for the characteristic impedance of the coaxial cable to fall within 50Ω±2Ω, which is a characteristic normally required for coaxial cables. Therefore, the compressibility of the inner conductor 11 is preferably 37.0% or less.

Characteristics required for the coaxial cable 10 according to this embodiment and an accompanying compressibility range suitable for the inner conductor 11 may also vary with the size of the coaxial cable 10. As the size of each constituent part of the coaxial cable 10 varies at approximately the same rate according to the size of the coaxial cable 10, a suitable compressibility range is described below based on an outside diameter D12 of the insulation 12.

(1-3-1) the Case where the Outside Diameter of the Insulation is 1.25 mm or More and Less than 1.75 mm In particular, when the outside diameter D12 of the insulation 12 is 1.25 mm or more and less than 1.75 mm, the compressibility of the inner conductor 11 is preferably 23.0% or more and 35.0% or less, and more preferably, 24.0% or more and 34.0% or less.

By causing the compressibility of the inner conductor 11 to be 23.0% or more when the outside diameter D12 of the insulation 12 is 1.25 mm or more and less than 1.75 mm, it is possible to sufficiently reduce attenuation with respect to 6.0 GHz signals, particularly for which it is required to reduce attenuation.

Furthermore, by causing the compressibility of the inner conductor 11 to be 35.0% or less, it is possible to increase the productivity of coaxial cables and to easily cause the characteristic impedance of coaxial cables to fall within 50Ω±2Ω.

(1-3-2) the Case where the Outside Diameter of the Insulation is 1.75 mm or More and Less than 2.25 mm In particular, when the outside diameter D12 of the insulation 12 is 1.75 mm or more and less than 2.25 mm, the compressibility of the inner conductor 11 is preferably 24.0% or more and 37.0% or less, and more preferably, 25.0% or more and 36.0% or less.

By causing the compressibility of the inner conductor 11 to be 24.0% or more when the outside diameter D12 of the insulation 12 is 1.75 mm or more and less than 2.25 mm, it is possible to sufficiently reduce attenuation with respect to 6.0 GHz signals, particularly for which it is required to reduce attenuation.

Furthermore, by causing the compressibility of the inner conductor 11 to be 37.0% or less, it is possible to increase the productivity of coaxial cables and to easily cause the characteristic impedance of coaxial cables to fall within 50Ω±2Ω.

(1-3-3) the Case where the Outside Diameter of the Insulation is 2.25 mm or More and 2.80 mm or Less In particular, when the outside diameter D12 of the insulation 12 is 2.25 mm or more and 2.80 mm or less, the compressibility of the inner conductor 11 is preferably 20.0% or more and 33.0% or less, and more preferably, 20.5% or more and 32.0% or less.

By causing the compressibility of the inner conductor 11 to be 20.0% or more when the outside diameter D12 of the insulation 12 is 2.25 mm or more and 2.80 mm or less, it is possible to sufficiently reduce attenuation with respect to 6.0 GHz signals, particularly for which it is required to reduce attenuation.

Furthermore, by causing the compressibility of the inner conductor 11 to be 33.0% or less, it is possible to increase the productivity of coaxial cables and to easily cause the characteristic impedance of coaxial cables to fall within 50Ω±2Ω.

(2) Insulation (2-1) About Materials

Materials for the insulation 12 are not limited in particular. Polymeric materials may be suitably used, and materials having a relative permittivity of 2.4 or less may be suitably used.

Materials that are low in molecular polarity, in particular, non-polar materials, may be suitably used for the insulation 12. As materials for the insulation 12, for example, one or more selected from polyolefins such as polyethylene and polypropylene and fluoropolymers such as polytetrafluoroethylene may be preferably used, and polyolefins may be more preferably used.

Materials for the insulation 12 may be cross-linked or foamed. Foaming makes it possible to reduce the relative permittivity of an insulation.

In addition to the above-noted polymeric materials, the insulation 12 may also contain various additives such as flame retardants.

As the relative permittivity of a material used for the insulation 12 decreases, the characteristic impedance of the coaxial cable 10 increases. Furthermore, as the thickness of the insulation 12 decreases, the characteristic impedance of the coaxial cable 10 decreases.

The characteristic impedance of the coaxial cable 10 is required to be within 50Ω±2Ω, namely, 48Ω or more and 52Ω or less. By using a material having a relative permittivity of 2.4 or less as a material for the insulation 12 in order to achieve such characteristic impedance, it is possible to easily achieve the required characteristic impedance even when the thickness of the insulation 12 is reduced, that is, the diameter of the coaxial cable 10 is reduced.

Therefore, by using a material having a relative permittivity of 2.4 or less as a material for the insulation 12, that is, by causing the relative permittivity of the insulation 12 to be 2.4 or less, it is also possible to reduce the diameter of the coaxial cable 10. Accordingly, it is possible to reduce the weight and to increase the ease of handling of the coaxial cable 10. Materials for the insulation 12 more preferably have a relative permittivity of 1.65 or less.

The lower limit value of the relative permittivity of materials for the insulation 12, which is not limited in particular, may be, for example, 1.2 or more.

As described below, the insulation 12 may include, for example, one or more insulation layers. Materials for the insulation 12 may be foamed as described above. Therefore, the insulation 12 may include, for example, a foamed polymeric material layer, and may include a foamed polyolefin layer. Inclusion of a foamed polyolefin layer in the insulation 12 decreases the relative permittivity of the insulation 12 to make it possible to reduce the thickness of the insulation 12, which is necessary to provide the coaxial cable 10 with a desired characteristic impedance. Therefore, it is possible to reduce the diameter of the coaxial cable 10, so that it is possible to reduce the weight and increase the ease of handling of the coaxial cable 10.

(2-2) About Structure

The insulation 12, which may be composed of a single insulation layer, may also be composed of multiple insulation layers.

That the insulation 12 includes multiple insulation layers means that the insulation 12 includes multiple layered insulation layers such as a first insulation layer 121, a second insulation layer 122, and a third insulation layer 123 in order from the inner conductor 11 side as illustrated in FIG. 1. FIG. 1 illustrates an example of including three insulation layers, while the configuration is not limited to this.

When the insulation 12 includes multiple insulation layers, the number of insulation layers is not limited in particular. Including too many insulation layers, however, may decrease productivity. Therefore, the number of insulation layers is preferably five or less, and more preferably, three or less.

Therefore, the insulation 12 preferably includes one or more insulation layers and three or less insulation layers.

Inclusion of one or more insulation layers in the insulation 12 facilitates adjustment of the relative permittivity and the thickness of the entire insulation 12. Therefore, the characteristic impedance of the coaxial cable 10 can be easily adjusted within a desired range. Furthermore, inclusion of three or less insulation layers in the insulation 12 makes it possible to increase the productivity of the coaxial cable 10.

When the insulation 12 includes multiple insulation layers, the configuration of each insulation layer is not limited in particular. The insulation layers may be different in contained material and the presence or absence of foaming and cross-linking.

For example, the insulation 12 may include the first insulation layer 121, the second insulation layer 122, and the third insulation layer 123 in order from the inner conductor 11 side.

In this case, a film thickness T122 of the second insulation layer 122 is preferably greater than a film thickness T121 of the first insulation layer and a film thickness T123 of the third insulation layer 123. That is, it is preferable that T122>T121 and T122>T123 be satisfied.

Furthermore, for example, a configuration where the first insulation layer 121 and the third insulation layer 123 are composed only of unfoamed polyolefin and the second insulation layer 122 is composed only of foamed polyolefin is preferable.

When the insulation 12 includes the first insulation layer 121 through the third insulation layer 123, by composing the first insulation layer 121 located on the surface side of the insulation 12 and the third insulation layer 123 only from unfoamed polyolefin, it is possible to prevent the breakage of the insulation 12 due to friction with other members, etc. By composing the second insulation layer 122, which is located in the middle in the thickness direction of the insulation 12, only from foamed polyolefin, it is possible to easily control characteristics of the insulation 12, such as relative permittivity, by adjusting the degree of foaming or the like, for example. By satisfying the relationship of T122>T121 and T122>T123 as described above, it is possible to increase the effect of the second insulation layer 122 over characteristics of the insulation 12, such as relative permittivity, and to control characteristics of the insulation 12 with particular ease.

Unfoamed polyolefin means being intentionally unfoamed. Therefore, it means that no air bubbles are visible to the naked eye with respect to, for example, a layer composed only of unfoamed polyolefin in a section of the coaxial cable 10 perpendicular to its longitudinal direction, for example.

(2-3) Outside Diameter of Insulation

The outside diameter D12 of the insulation 12 may be selected according to characteristic impedance or the like required for the coaxial cable 10. For example, the outside diameter D12 of the insulation 12 is preferably 1.25 mm or more and 2.80 mm or less, and more preferably, 1.50 mm or more and 2.70 mm or less.

The outside diameter D12 of the insulation 12 as described above is the outside diameter of the outermost insulation layer among the insulation layers of the insulation 12 covered by the outer conductor 13 in the coaxial cable 10 as illustrated in FIG. 1. Therefore, in the case of the coaxial cable 10 as illustrated in FIG. 1, the outside diameter D12 of the insulation 12 is the outside diameter of the third insulation layer 123, which is located at the outermost layer in the insulation 12 covered by the outer conductor 13.

The coaxial cable according to this embodiment may be used as, for example, an in-vehicle cable, and can be within the range of allowable outside diameters for in-vehicle connectors by causing the outside diameter D12 of the insulation 12 to be 1.25 mm or more and 2.80 mm or less.

The outside diameter D12 of the insulation 12 may be measured according to JIS C 3005 (2014). Specifically, the outside diameter of the insulation 12 may be measured at two or more locations within the same plane perpendicular to the central axis of the coaxial cable 10, and the average may be determined as the outside diameter of the insulation.

When the outside diameter of the insulation 12 is measured at two or more locations as described above in the same plane perpendicular to the central axis of the coaxial cable 10, namely, within a single section of the coaxial cable 10 perpendicular to its central axis, the outside diameter is measured along a diameter of the insulation. In performing the above-described measurement, it is preferable to select measurement locations such that the angle between diameters of the insulation along which measurement is performed is substantially uniform. Specifically, for example, the outside diameter of the insulation 12 may be measured along two orthogonal diameters of the insulation 12 in a plane perpendicular to the central axis of the coaxial cable 10 with respect to which measurement is performed, and the average may be determined as the outside diameter of the insulation. Diameters D11, D13 and D14 of the inner conductor 11, the outer conductor 13, and the sheath 14 as well may be measured in the same manner.

(3) Outer Conductor

The outer conductor 13 may be disposed to cover the outer periphery of the insulation 12. The outer conductor 13, which may be composed of a single layer of an outer conductor, may also be composed of two or more layers of outer conductors. In the light of increasing a noise shielding effect in the coaxial cable 10 in particular, the coaxial cable 10 preferably has two or more layers of outer conductors as the outer conductor 13. In the light of productivity, etc., however, the outer conductor 13 preferably has two layers. That is, the outer conductor 13 preferably has a first outer conductor 131 and a second outer conductor 132 in order from the insulation 12 side.

Disposing the first outer conductor 131 and the second outer conductor 132 in layers as the outer conductor 13 increases the volume of a conductive material surrounding the outer periphery of the inner conductor 11, so that a higher noise shielding effect can be achieved than in the case of using only one type of outer conductor. That is, by including the two-layer outer conductor 13, it is possible to effectively block the entry of noise from the outside and the exit of noise to the outside.

As described below, the coaxial cable 10 according to this embodiment may employ, for example, a composite material of a substrate and a metal film as the first outer conductor 131 and a braided shield into which metal element wires are braided (braided shield) as the second outer conductor 132. By disposing the metal film of the first outer conductor 131 and the braided shield of the second outer conductor 132 in direct contact with each other, it is possible to increase noise shielding by the outer conductor 13 in a particularly effective manner.

A configuration in the case where the coaxial cable 10 includes the two outer conductor layers of the first outer conductor 131 and the second outer conductor 132 as the outer conductor 13 is described below.

(3-1) First Outer Conductor

The first outer conductor 131 may be, for example, a film member including a metal film. Because of the presence of the metal film, the first outer conductor 131 serves to block the entry of noise from the outside into and the exit of noise to the outside from the inner conductor 11.

In the case of using a film material including a metal film as the first outer conductor 131, the first outer conductor 131 may be composed only of a single metal film or may be a composite material having a metal film stacked on a substrate or the like.

In the case of being composed of a composite material, the first outer conductor 131 may include a polymeric film serving as a substrate and a metal film placed on a surface of the substrate.

The method of placing a metal film on a surface of the substrate is not limited in particular. The metal film may be formed on and fixed onto the substrate by vapor deposition, plating, bonding, or the like. By composing the first outer conductor 131 from a composite material of a substrate and a metal film, it is possible to increase mechanical strength and improve the ease of handling compared with the case where the first outer conductor 131 is composed only of a single metal film. Increasing the mechanical strength of the first outer conductor 131 causes the first outer conductor 131 to be less susceptible to damage or the like when the coaxial cable 10 is bent, thus making it possible to particularly increase the bending resistance of the coaxial cable 10.

In the case of using a film member including a metal film as the first outer conductor 131 as described above, the metal film is not limited to a particular type, and may be a metal material such as copper, a copper alloy, aluminum, an aluminum alloy, or the like. The metal film may be composed of a film of a single type of metal or may be formed by stacking two or more types of metal in layers. Furthermore, a material other than metal, such as a protective film formed of an organic material, may be placed on a surface of the metal film on an as-needed basis.

The first outer conductor 131 may also include a substrate as described above. Materials for the substrate are not limited in particular. Examples of materials for the substrate may include polyester resins such as polyethylene terephthalate (PET), polyolefin resins such as polypropylene, and vinyl resins such as polyvinyl chloride. The substrate may contain various types of additives or the like in addition to various types of macromolecular species. As macromolecular species, polyester resin may be suitably used in the light of good mechanical strength and flexibility.

When the first outer conductor 131 is a composite material of a substrate and a metal film, the substrate, the metal film, and the first outer conductor 131 are not limited in thickness in particular.

For example, in the light of ensuring a small diameter and the flexibility of the coaxial cable 10, the thickness of the entirety of the first outer conductor 131 is preferably 500 μm or less and more preferably 100 μm or less.

Furthermore, in the light of ensuring the sufficient mechanical strength and ease of handling of the first outer conductor 131, the substrate is preferably thicker than the metal film and is preferably 10 μm or more in thickness in particular.

In the light of providing sufficient noise shielding, etc., the thickness of the metal film is preferably 1 μm or more. On the other hand, in the light of ensuring flexibility, etc., the thickness of the metal film is preferably 30 μm or less. The metal film may be provided on one side or both sides of the substrates. In the case of bonding the first outer conductor 131 to the insulation 12, however, it is preferable to provide an adhesive layer of an adhesive agent on one of the two surfaces of the substrate which one faces the insulation, and it is preferable to provide the metal film on one of the two surfaces which one is on the side opposite from the surface facing the insulation.

(3-2) Second Outer Conductor

The second outer conductor 132 may have a hollow cylindrical structure into which thin metal element wires are braided, where the thin metal element wires are formed of, for example, a metal material such as copper, a copper alloy, aluminum, or an aluminum alloy or such a metal material whose surface is plated. That is, the second outer conductor 132 may be a braided shield into which metal element wires are braided. Annealed copper wires, hard drawn copper wires or the like may be used as metal element wires. As described above, the surfaces of metal element wires may be plated, for example, silver-plated or tin-plated. Therefore, as metal element wires, for example, silver-plated annealed copper wires, tin-plated annealed copper wires or the like may be used, and for example, a braided shield of silver-plated annealed copper wires or tin-plated annealed copper wires may be used.

The second outer conductor 132 serves to block the entry of noise from the outside into and the exit of noise to the outside from the inner conductor 11.

The first outer conductor 131 and the second outer conductor 132 of the outer conductor 13 of the coaxial cable according to this embodiment are not limited to a particular combination, and may employ respective materials and structures that have been described so far. For example, the first outer conductor 131 may be copper-coated polyester tape and the second outer conductor 132 may be a braided shield of tin-plated annealed copper wires.

By placing the above-noted members in layers as the first outer conductor 131 and the second outer conductor 132 of the outer conductor 13, a particularly high noise shielding effect can be achieved. That is, it is possible to effectively block the entry of noise from the outside and the exit of noise to the outside in particular.

(4) Sheath

Materials for the sheath 14 are not limited in particular. The sheath 14 may be placed in such a manner as to cover the outer periphery of the outer conductor 13. The sheath 14 serves to physically protect the outer conductor 13 and the inner conductor 11.

The sheath 14 may include a polymeric material. The polymeric material is not limited in particular. For example, one or more selected from polyolefins such as polyethylene and polypropylene, polyvinylchloride, polystyrene, polytetrafluoroethylene, polyphenylene sulfide, etc. may be used.

The sheath 14 may be composed only of a polymeric material, but may also contain an additive such as a flame retardant in addition to a polymeric material.

The polymeric material contained in the sheath 14 may be foamed or cross-linked.

The outside diameter D14 of the sheath 14 is not limited in particular, but is preferably 2.90 mm or more and 4.20 mm or less, and more preferably, 3.00 mm or more and 4.00 mm or less.

The coaxial cable according to this embodiment may be used as, for example, an in-vehicle cable, and can be within the range of allowable outside diameters for in-vehicle connectors by causing the outside diameter D14 of the sheath 14 to be 2.90 mm or more and 4.20 mm or less.

An embodiment is described in detail above. It is, however, not limited to a specific embodiment, and various variations and modifications may be made within the scope of the claims.

(Additional Notes)

As is understood from the above-described embodiment, this specification includes a disclosure of the following aspect.

(1) A coaxial cable including:
- an inner conductor;
- an insulation covering an outer periphery of the inner conductor;
- an outer conductor covering an outer periphery of the insulation; and
- a sheath covering an outer periphery of the outer conductor,
- wherein the inner conductor is a compressed conductor including a central element wire and multiple peripheral element wires surrounding the central element wire,
- the inner conductor has a compressibility of 20.0% or more and 37.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1=n\times\pi\times0.25\times D^2 \quad (A)$$

$$\text{Compressibility}=[1-S2/S1] \quad (B), \text{ and}$$

an outside diameter of the insulation is 1.25 mm or more and 2.80 mm or less.

EXAMPLES

A description is given below with reference to specific examples, but the present invention is not limited to these examples.

(Evaluation Method)

First, a method of evaluating coaxial cables made in the following experimental examples is described. (1) The outside diameter D11 of the inner conductor, the outside diameter D12 of the insulation, the outside diameter D13 of the outer conductor, and the outside diameter D14 of the sheath The outside diameter D11 of the inner conductor, the outside diameter D12 of the insulation, the outside diameter D13 of the outer conductor, and the outside diameter D14 of the sheath were measured according to JIS C 3005 (2014).

Specifically, for example, the outside diameter of the inner conductor 11 was measured at two locations in the same plane perpendicular (at right angles) to the central axis of the coaxial cable 10, and the average was determined as the outside diameter D11 of the inner conductor 11. The outside diameter D11 of the inner conductor 11 was measured along two orthogonal diameters in a plane perpendicular to the central axis of the coaxial cable 10 with respect to which measurement was performed, and the average was determined as the outside diameter D11 of the inner conductor 11 as described above.

Here, while a description is given, taking the inner conductor 11 as an example, measurement was performed in the same manner with respect to the outside diameters of the insulation 12, the outer conductor 13, and the sheath 14 as well.

(2) Compressibility of Inner Conductor

The compressibility may be calculated, for example, from the sectional area S1 of the conductor before compression and the sectional area S2 of the compressed conductor, using Eq. (B) below, and be expressed as a percentage. The sectional area S1 is calculated from the outside diameter D of the central element wire and the total number n of the central element wire and the peripheral element wires, using Eq. (A) below. That is, the value obtained by multiplying the value calculated by Eq. (B) below by 100 may be a compressibility in the case of being expressed as a percentage.

$$S1=n\times\pi\times0.25\times D^2 \quad (A)$$

$$\text{Compressibility}=[1-S2/S1] \quad (B),$$

where n in Eq. (A) is the total number of the central element wires and the peripheral element wires as described above. Therefore, in the case of the coaxial cable 10 illustrated in FIG. 1, n=7.

S1 in Eq. (B) is the sectional area of the conductor before compression, namely, the sectional area of the portion of the conductor element wires 211 in the stranded wire 21 before being formed into a compressed conductor. S2 in Eq. (B) is the sectional area of the portion of the conductor element wires in the compressed conductor.

S1, which is the sectional area of the portion of the conductor element wires 211 in the stranded wire 21 before being formed into a compressed conductor, is calculated, following the procedure below.

The outside diameter D of the central element wire 111A among the conductor element wires 111 of the inner conductor 11 was measured in a section of a coaxial cable perpendicular to its longitudinal direction with respect to the coaxial cables made in the following experimental examples. Within the compressibility range of the coaxial cables of the below-described experimental examples, the central element wire 111A partially maintains a circular shape. Therefore, of the widths of the central element wire 111A passing through the center of the section of the central element wire 111A, the largest width was determined as the outside diameter D of the central element wire 111A.

The sectional area of the central element wire 111A was calculated from the outside diameter D of the central element wire 111A, and was multiplied by the number of the conductor element wires 111 of the inner conductor 11, thereby calculating S1, which is the sectional area of the conductor before compression, namely, the sectional area of the portion of the conductor element wires 211 in the stranded wire 21 before being formed into a compressed conductor.

S2, which is the sectional area of the portion of the conductor element wires in the compressed conductor, was calculated from the section of the coaxial cable perpendicular to its longitudinal direction, using image processing software (manufactured by JSOL CORPORATION, product name: Simpleware Software).

Using S1 and S2 measured and calculated in the above-described manner, the compressibility of the inner conductor of each experimental example was measured by Eq. (B) described above.

(3) Characteristic Impedance

Characteristic impedance was measured by Time Domain Reflectometry (TDR) with respect to the coaxial cables made in the following experimental examples.

Those with a characteristic impedance within 50Ω±2Ω were determined as being acceptable and evaluated as A. Those with a characteristic impedance outside the above-described range were determined as being unacceptable and evaluated as B.

With respect to those whose results of evaluation of characteristic impedance were acceptable, namely, A, the following attenuation and bending resistance test was conducted. With respect to those whose results of evaluation of characteristic impedance were unacceptable, namely, B, except some samples, the following attenuation and bending resistance test was not conducted and the evaluation was terminated.

(4) Attenuation

Measurement was performed using a network analyzer, with respect to the five-meter-long coaxial cable made in each of the following experimental examples. Attenuation was measured with respect to a 6.0 GHz signal.

In the case of the outside diameter D12 of the insulation 12 being 1.25 mm or more and less than 1.75 mm, those with an attenuation of 1.90 dB/m or less were determined as being acceptable and those with an attenuation exceeding 1.90 dB/m were determined as being unacceptable.

In the case of the outside diameter D12 of the insulation 12 being 1.75 mm or more and less than 2.25 mm, those with an attenuation of 1.65 dB/m or less were determined as being acceptable and those with an attenuation exceeding 1.65 dB/m were determined as being unacceptable.

In the case of the outside diameter D12 of the insulation 12 being 2.25 mm or more and 2.80 mm or less, those with an attenuation of 1.29 dB/m or less were determined as being acceptable and those with an attenuation exceeding 1.29 dB/m were determined as being unacceptable.

Those acceptable were evaluated A and those unacceptable were evaluated B.

(5) Bending Resistance Test

Figure 3:
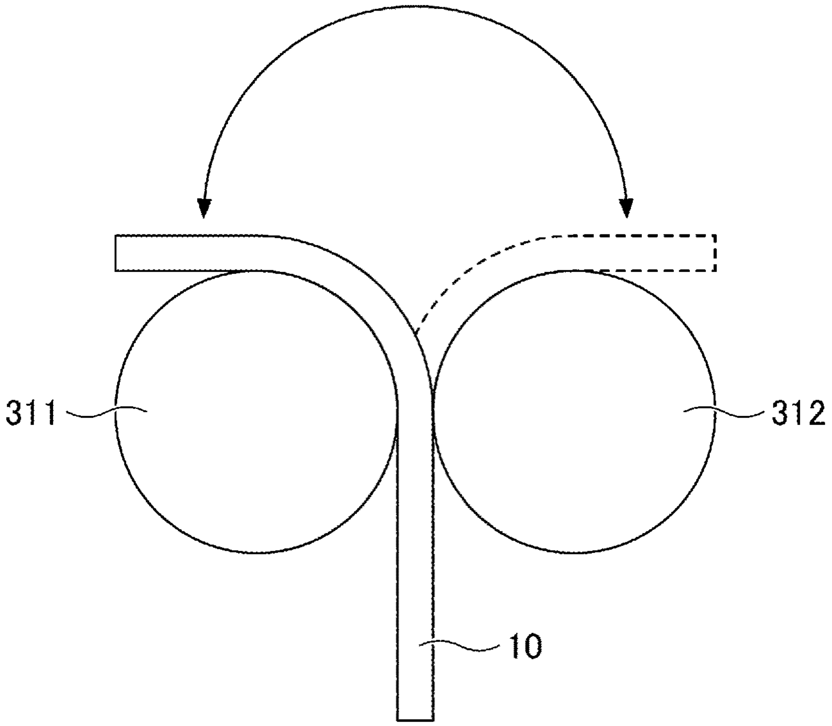
FIG. 3 is a diagram illustrating a bending resistance test.

As illustrated in FIG. 3, the coaxial cable 10 to be evaluated was placed and sandwiched between two mandrels 311 and 312 of 12.5 mm in diameter placed horizontally and parallel to each other, and a load of 500 gf (4.9N) was applied vertically downward to the coaxial cable 10. In this state, the upper end of the coaxial cable 10 was horizontally bent 90° to contact the upper side of the mandrel 311 and was thereafter horizontally bent 90° to contact the upper side of the other mandrel 312. This was repeatedly performed.

The number of times of bending before the inner conductor 11 was broken to disable conduction was counted. One time of bending is from the leftward and then rightward bending of the coaxial cable to the subsequent returning of the coaxial cable to the left side. The bending resistance test was conducted such that the above-described number of times of bending per minute was 60. A larger number of times of bending that is the result of the above-described bending resistance test means better bending resistance.

Those with the number of times of bending of 500 or more were determined as being acceptable and evaluated as A. Those with the number of times of bending of less than 500 were determined as being unacceptable and evaluated as B.

The bending resistance test was conducted at room temperature (23° C.).

(6) Comprehensive Evaluation

Those acceptable in the result of evaluation of attenuation and the result of evaluation of the bending resistance test were evaluated as A, and those unacceptable in at least one of the result of evaluation of attenuation and the result of evaluation of the bending resistance test were evaluated as B.

The comprehensive evaluation of A means that a coaxial cable enjoys reduced attenuation and good bending resistance.

The coaxial cables of the experimental examples are described below.

Experimental Example 1

The coaxial cables of Experimental Example 1-1 through Experimental Example 1-9 below were made and evaluated.

Experimental Examples 1-2 through 1-4 are examples according to the embodiment and Experimental Example 1-1 and Experimental Example 1-5 through Experimental Example 1-9 are comparative examples.

Experimental Example 1-1

A coaxial cable having the sectional shape as illustrated in FIG. 1 was made according to the following procedure.

(Inner Conductor 11)

A stranded wire into which seven element wires, which were annealed copper wires and 0.254 mm in element wire diameter, were stranded was prepared. This stranded wire was compressed into a compressed conductor serving as the inner conductor 11. At this point, the size of a die to pass through during compression was selected such that the compressibility had the value as illustrated in Table 1.

The inner conductor 11 has a configuration in which the six peripheral element wires 111B are placed around the single central element wire 111A. The same element wires are used for the central element wire and the peripheral element wires.

(Insulation 12)

The insulation 12 was placed on the outer periphery of the inner conductor 11. The insulation 12 includes the first insulation layer 121, the second insulation layer 122, and the third insulation layer 123. Unfoamed polyolefin was used as the first insulation layer 121 and the third insulation layer 123, and was cross-linked by being irradiated with an electron beam. Foamed polyolefin was used as the material of the second insulation layer 122, and was cross-linked by being irradiated with an electron beam. The thickness of the insulation 12 was adjusted such that the outside diameter D12 of the insulation 12 had the value as illustrated in Table 1. The irradiation of an electron beam for cross-linking the first insulation layer 121, the second insulation layer 122, and the third insulation layer 123 was performed on the first insulation layer 121, the second insulation layer 122, and the third insulation layer 123 at once after formation of the three layers.

In the rows of the material and the foaming ratio of the insulation 12 in Table 1 and Tables 2 and 3 as described below, only the configuration of the second insulation layer 122 having the largest film thickness in the insulation is shown. For example, in Experimental Example 1-2, the film thickness T121 of the first insulation layer 121 was 0.02 mm, the film thickness T122 of the second insulation layer 122 was 0.41 mm, and the film thickness T123 of the third insulation layer 123 was 0.10 mm. The thickness of each insulation layer was measured at four locations in total along two orthogonal diameters in the same plane of the coaxial cable 10 perpendicular (at right angles) to its central axis, and the average was employed. The relative permittivity, the thickness, and the outside diameter D12 are the values of the entirety of the insulation 12.

(Outer Conductor 13)

Copper-coated polyester tape having a copper layer on a first principal surface of a polyester resin substrate and an adhesive layer on a second principal surface of the substrate on the side opposite from the first principal surface was bonded to the outer periphery of the insulation 12 with the adhesive layer to form the first outer conductor 131.

Tin-plated annealed copper wires were placed on the outer periphery of the first outer conductor 131 in such a manner as to form a braid structure to form the second outer conductor 132. As the second outer conductor 132, 16 units of tin-plated annealed copper wires of 0.1 mm in outside diameter, each unit having five of them arranged in parallel, were employed to form a braided shield. In Table 1, with respect to the configuration of the second outer conductor, the number of units, the number of tin-plated annealed copper wires forming a single unit, and the outside diameter of the tin-plated annealed copper wires are written in this order in the row of "configuration."

(Sheath 14)

The sheath 14 of polyvinyl chloride (PVC) was formed on the outer periphery of the outer conductor 13 to manufacture the coaxial cable of this experimental example. In the table, polyvinyl chloride is expressed as PVC.

The obtained coaxial cable was evaluated as described above. The evaluation results are shown in Table 1.

Experimental Example 1-2 Through Experimental Example 1-5

The coaxial cables were manufactured and evaluated in the same manner as in the case of Experimental Example 1-1 except that the condition of compression for the inner conductor 11 was changed.

The evaluation results are shown in Table 1.

Experimental Example 1-6

As the inner conductor, a non-compressed stranded wire was used instead of a compressed conductor, and element wires of 0.205 mm in element wire diameter were used for the stranded wire.

Otherwise, the coaxial cable was manufactured and evaluated in the same manner as in the case of Experimental Example 1-1.

The evaluation results are shown in Table 1.

Experimental Example 1-7

As the inner conductor 11, a single-wire conductor of 0.67 mm in outside diameter was employed instead of a stranded wire.

Otherwise, the coaxial cable was manufactured and evaluated in the same manner as in the case of Experimental Example 1-1.

The evaluation results are shown in Table 1.

Experimental Example 1-8, Experimental Example 1-9

The conditions for manufacturing and compressing the inner conductor 11 were changed to the conditions shown in Table 1. Furthermore, the material of the insulation 12 was changed to the materials shown in Table 1. In Experimental Example 1-8 and Experimental Example 1-9, the insulation 12 was formed of a single insulation layer, and neither foaming nor cross-linking was performed. In Table 1, PVC stands for polyvinyl chloride and PP stands for polypropylene. Otherwise, the coaxial cables were manufactured and evaluated in the same manner as in the case of Experimental Example 1-1.

The evaluation results are shown in Table

TABLE 1

| | | | Exp. Ex. 1-1 | Exp. Ex. 1-2 | Exp. Ex. 1-3 |
|---|---|---|---|---|---|
| Inner conductor 11 | Material | — | Annealed copper wire (compressed conductor) | Annealed copper wire (compressed conductor) | Annealed copper wire (compressed conductor) |
| | Config. | No. | 7 | 7 | 7 |
| | OD D of central element wire | mm | 0.254 | 0.254 | 0.254 |
| | Compressibility | % | 16.5 | 23.0 | 29.5 |
| | OD D11 | mm | 0.696 | 0.66 | 0.64 |
| Insulation 12 | Material | — | Cross-linked foamed polyolefin | Cross-linked foamed polyolefin | Cross-linked foamed polyolefin |
| | Relative permittivity | — | 1.56 | 1.56 | 1.56 |
| | Foaming ratio | % | 59 | 59 | 59 |
| | Thickness | mm | 0.525 | 0.53 | 0.54 |
| | OD D12 | mm | 1.72 | 1.72 | 1.72 |
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/5/0.1 | 16/5/0.1 | 16/5/0.1 |
| | OD D13 | mm | 2.32 | 2.32 | 2.32 |
| Sheath 14 | Material | — | PVC | PVC | PVC |
| | Thickness | mm | 0.34 | 0.34 | 0.34 |
| | OD D14 | mm | 3.0 | 3.0 | 3.0 |
| Charc. impedance | Measured value | Ω | 45.9 | 48.5 | 50.1 |
| | Evaluation | | B | A | A |
| Atten. | Measured value | dB/m | 1.91 | 1.89 | 1.87 |
| | Evaluation | | B | A | A |
| Bending resist. test | No. of times of bending | Times | — | 1264 | 1225 |
| | Evaluation | | — | A | A |

TABLE 1-continued

| | | | | | |
|---|---|---|---|---|---|
| Comprehensive evaluation | | | B | A | A |
| | | | Exp. Ex. 1-4 | Exp. Ex. 1-5 | Exp. Ex. 1-6 |
| Inner conductor 11 | Material | — | Annealed copper wire (compressed conductor) | Annealed copper wire (compressed conductor) | Annealed copper wire |
| | Config. | No. | 7 | 7 | 7 |
| | OD D of central element wire | mm | 0.254 | 0.254 | 0.205 |
| | Compressibility | % | 34.0 | 35.9 | — |
| | OD D11 | mm | 0.62 | 0.61 | 0.61 |
| Insulation 12 | Material | — | Cross-linked foamed polyolefin | Cross-linked foamed polyolefin | Cross-linked foamed polyolefin |
| | Relative permittivity | — | 1.56 | 1.56 | 1.63 |
| | Foaming ratio | % | 59 | 59 | 52 |
| | Thickness | mm | 0.55 | 0.555 | 0.505 |
| | OD D12 | mm | 1.72 | 1.72 | 1.62 |
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/5/0.1 | 16/5/0.1 | 16/5/0.1 |
| | OD D13 | mm | 2.32 | 2.32 | 2.22 |
| Sheath 14 | Material | — | PVC | PVC | PVC |
| | Thickness | mm | 0.34 | 0.34 | 0.39 |
| | OD D14 | mm | 3.0 | 3.0 | 3.0 |
| Charc. impedance | Measured value | Ω | 51.5 | 52.4 | 49.5 |
| | Evaluation | | A | B | A |
| Atten. | Measured value | dB/m | 1.86 | — | 2.01 |
| | Evaluation | | A | — | B |
| Bending resist. test | No. of times of bending | Times | 1198 | — | 1325 |
| | Evaluation | | A | — | A |
| Comprehensive evaluation | | | A | B | B |
| | | | Exp. Ex. 1-7 | Exp. Ex. 1-8 | Exp. Ex. 1-9 |
| Inner conductor 11 | Material | — | Annealed copper wire (single wire) | Annealed copper wire (compressed conductor) | Annealed copper wire (compressed conductor) |
| | Config. | No. | 1 | 7 | 7 |
| | OD D of central element wire | mm | 0.67 | 0.165 | 0.265 |
| | Compressibility | % | — | 17.4 | 22.5 |
| | OD D11 | mm | 0.67 | 0.45 | 0.7 |
| Insulation 12 | Material | — | Cross-linked foamed polyolefin | PVC | PP |
| | Relative permittivity | — | 1.31 | 3.6 | 2.5 |
| | Foaming ratio | % | 81 | — | — |
| | Thickness | mm | 0.525 | 0.52 | 0.475 |
| | OD D12 | mm | 1.72 | 1.51 | 1.5 |

TABLE 1-continued

| | | | | | |
|---|---|---|---|---|---|
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/5/0.1 | 16/5/0.1 | 16/5/0.1 |
| | OD D13 | mm | 2.32 | 2.32 | 2.32 |
| Sheath 14 | Material | — | PVC | PVC | PVC |
| | Thickness | mm | 0.34 | 0.34 | 0.34 |
| | OD D14 | mm | 3.0 | 3.0 | 3.0 |
| Charc. impedance | Measured value | Ω | 50.1 | 39.9 | 30.9 |
| | Evaluation | | A | B | B |
| Atten. | Measured value | dB/m | 1.75 | — | — |
| | Evaluation | | A | — | — |
| Bending resist. test | No. of times of bending | Times | 478 | 1 | 1 |
| | Evaluation | | B | — | — |
| Comprehensive evaluation | | | B | B | B |

From the evaluation results of Experimental Example 1-1 through Experimental Example 1-5, it has been found that the use of a compressed conductor that is a stranded wire whose compressibility is within a predetermined range for the inner conductor makes it possible to achieve a coaxial cable whose electrical characteristics, specifically, characteristic impedance and attenuation, are within predetermined ranges and that has good bending resistance.

In contrast, it has been found that attenuation is increased in the coaxial cable of Experimental Example 1-6 that uses a non-compressed stranded wire for the inner conductor. Furthermore, it has been found that bending resistance is reduced in the coaxial cable of Experimental Example 1-7 that uses a single wire instead of a stranded wire for the inner conductor.

Experimental Example 2

The coaxial cables of Experimental Example 2-1 through Experimental Example 2-7 below were made and evaluated.

Experimental Examples 2-2 through 2-4 are examples according to the embodiment and Experimental Example 2-1 and Experimental Example 2-5 through Experimental Example 2-7 are comparative examples.

Experimental Example 2-1

A coaxial cable having the sectional shape as illustrated in FIG. 1 was made according to the following procedure.

(Inner Conductor 11)

A stranded wire into which seven element wires, which were annealed copper wires and 0.32 mm in element wire diameter, were stranded was prepared. This stranded wire was compressed into a compressed conductor serving as the inner conductor 11. At this point, the size of a die to pass through during compression was selected such that the compressibility had the value as illustrated in Table 2.

The inner conductor 11 has a configuration in which the six peripheral element wires 111B are placed around the single central element wire 111A. The same element wires are used for the central element wire and the peripheral element wires.

(Insulation 12)

The insulation 12 was placed on the outer periphery of the inner conductor 11. The insulation 12 includes the first insulation layer 121, the second insulation layer 122, and the third insulation layer 123. Unfoamed polyolefin was used as the first insulation layer 121 and the third insulation layer 123, and was cross-linked by being irradiated with an electron beam. Foamed polyolefin was used as the material of the second insulation layer 122, and was cross-linked by being irradiated with an electron beam. The thickness of the insulation 12 was adjusted such that the outside diameter D12 of the insulation 12 had the value as illustrated in Table 2.

(Outer Conductor 13)

Copper-coated polyester tape having a copper layer on a first principal surface of a polyester resin substrate and an adhesive layer on a second principal surface of the substrate on the side opposite from the first principal surface was bonded to the outer periphery of the insulation 12 with the adhesive layer to form the first outer conductor 131.

Tin-plated annealed copper wires were placed on the outer periphery of the first outer conductor 131 in such a manner as to form a braid structure to form the second outer conductor 132. As the second outer conductor 132, 16 units of tin-plated annealed copper wires of 0.08 mm in outside diameter, each unit having eight of them arranged in parallel, were employed to form a braided shield. In Table 2, with respect to the configuration of the second outer conductor, the number of units, the number of tin-plated annealed copper wires forming a single unit, and the outside diameter of the tin-plated annealed copper wires are written in this order in the row of "configuration."

(Sheath 14)

The sheath 14 of polyvinyl chloride (PVC) was formed on the outer periphery of the outer conductor 13 to manufacture the coaxial cable of this experimental example. In the table, polyvinyl chloride is expressed as PVC.

The obtained coaxial cable was evaluated as described above. The evaluation results are shown in Table 2.

Experimental Example 2-2 Through Experimental Example 2-5

The coaxial cables were manufactured and evaluated in the same manner as in the case of Experimental Example 2-1 except that the condition of compression for the inner conductor 11 was changed.

The evaluation results are shown in Table 2.

Experimental Example 2-6

As the inner conductor, a non-compressed stranded wire was used instead of a compressed conductor, and element wires of 0.254 mm in element wire diameter were used for the stranded wire.

Otherwise, the coaxial cable was manufactured and evaluated in the same manner as in the case of Experimental Example 2-1.

The evaluation results are shown in Table 2.

Experimental Example 2-7

As the inner conductor 11, a single-wire conductor of 0.78 mm in outside diameter was employed instead of a stranded wire.

Otherwise, the coaxial cable was manufactured and evaluated in the same manner as in the case of Experimental Example 2-1.

The evaluation results are shown in Table 2.

TABLE 2

| | | | Exp. Ex. 2-1 | Exp. Ex. 2-2 | Exp. Ex. 2-3 |
|---|---|---|---|---|---|
| Inner conductor 11 | Material | — | Annealed copper wire (compressed conductor) | Annealed copper wire (compressed conductor) | Annealed copper wire (compressed conductor) |
| | Config. | No. | 7 | 7 | 7 |
| | OD D of central element wire | mm | 0.32 | 0.32 | 0.32 |
| | Compressibility | % | 18.0 | 24.0 | 30.6 |
| | OD D11 | mm | 0.87 | 0.83 | 0.8 |
| Insulation 12 | Material | — | Cross-linked foamed polyolefin | Cross-linked foamed polyolefin | Cross-linked foamed polyolefin |
| | Relative permittivity | — | 1.55 | 1.55 | 1.55 |
| | Foaming ratio | % | 58 | 58 | 58 |
| | Thickness | mm | 0.605 | 0.609 | 0.625 |
| | OD D12 | mm | 2.05 | 2.05 | 2.05 |
| $1^{st}$ outer conductor 131 | Material | — | Copper-coated polyester tape (vertical attachment) | Copper-coated polyester tape (vertical attachment) | Copper-coated polyester tape (vertical attachment) |
| $2^{nd}$ outer conductor 132 | Material | — | Tin-plated annealed copper wire braid | Tin-plated annealed copper wire braid | Tin-plated annealed copper wire braid |
| | Config. | Unit/no./mm | 16/8/0.08 | 16/8/0.08 | 16/8/0.08 |
| | OD D13 | mm | 2.50 | 2.50 | 2.50 |
| Sheath 14 | Material | — | PVC | PVC | PVC |
| | Thickness | mm | 0.40 | 0.40 | 0.40 |
| | OD D14 | mm | 3.3 | 3.3 | 3.3 |
| Charc. impedance | Measured value | Ω | 45.8 | 48.0 | 50.0 |
| | Evaluation | | B | A | A |
| Atten. | Measured value | dB/m | 1.66 | 1.64 | 1.61 |
| | Evaluation | | B | A | A |
| Bending resist. test | No. of times of bending | Times | — | 1296 | 1271 |
| | Evaluation | | — | A | A |
| Comprehensive evaluation | | | B | A | A |

| | | | Exp. Ex. 2-4 | Exp. Ex. 2-5 | Exp. Ex. 2-6 |
|---|---|---|---|---|---|
| Inner conductor 11 | Material | — | Annealed copper wire (compressed conductor) | Annealed copper wire (compressed conductor) | Annealed copper wire |
| | Config. | No. | 7 | 7 | 7 |
| | OD D of | mm | 0.32 | 0.32 | 0.254 |

TABLE 2-continued

| | | | | | |
|---|---|---|---|---|---|
| | central element wire | | | | |
| | Compressibility | % | 36.0 | 37.3 | — |
| | OD D11 | mm | 0.77 | 0.76 | 0.762 |
| Insulation 12 | Material | — | Cross-linked foamed polyolefin | Cross-linked foamed polyolefin | Cross-linked foamed polyolefin |
| | Relative permittivity | — | 1.55 | 1.55 | 1.66 |
| | Foaming ratio | % | 58 | 58 | 56 |
| | Thickness | mm | 0.641 | 0.645 | 0.62 |
| | OD D12 | mm | 2.05 | 2.05 | 2 |
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/8/0.08 | 16/8/0.08 | 16/8/0.08 |
| | OD D13 | mm | 2.50 | 2.50 | 2.50 |
| Sheath 14 | Material | — | PVC | PVC | PVC |
| | Thickness | mm | 0.40 | 0.40 | 0.40 |
| | OD D14 | mm | 3.3 | 3.3 | 3.3 |
| Charc. impedance | Measured value | Ω | 51.8 | 52.3 | 50.4 |
| | Evaluation | | A | B | A |
| Atten. | Measured value | dB/m | 1.60 | — | 1.70 |
| | Evaluation | | A | — | B |
| Bending resist. test | No. of times of bending | Times | 1240 | — | 1550 |
| | Evaluation | | A | — | A |
| Comprehensive evaluation | | | A | B | B |

| | | | Exp. Ex. 2-7 |
|---|---|---|---|
| Inner conductor 11 | Material | — | Annealed copper wire (single wire) |
| | Config. | No. | 1 |
| | OD D of central element wire | mm | 0.78 |
| | Compressibility | % | — |
| | OD D11 | mm | 0.78 |
| Insulation 12 | Material | — | Cross-linked foamed polyolefin |
| | Relative permittivity | — | 1.31 |
| | Foaming ratio | % | 80 |
| | Thickness | mm | 0.61 |
| | OD D12 | mm | 2 |
| 1st outer conductor 131 | Material | — | Copper-coated polyester tape (vertical attachment) |
| 2nd outer conductor 132 | Material | — | Tin-plated annealed copper wire braid |
| | Config. | Unit/no./mm | 16/8/0.08 |
| | OD D13 | mm | 2.50 |

TABLE 2-continued

| | | | |
|---|---|---|---|
| Sheath 14 | Material | — | PVC |
| | Thickness | mm | 0.40 |
| | OD D14 | mm | 3.3 |
| Charc. impedance | Measured value | Ω | 50.0 |
| | Evaluation | | A |
| Atten. | Measured value | dB/m | 1.54 |
| | Evaluation | | A |
| Bending resist. test | No. of times of bending | Times | 497 |
| | Evaluation | | B |
| Comprehensive evaluation | | | B |

From the evaluation results of Experimental Example 2-1 through Experimental Example 2-5, it has been found that the use of a compressed conductor that is a stranded wire whose compressibility is within a predetermined range for the inner conductor makes it possible to achieve a coaxial cable whose electrical characteristics, specifically, characteristic impedance and attenuation, are within predetermined ranges and that has good bending resistance.

In contrast, it has been found that attenuation is increased in the coaxial cable of Experimental Example 2-6 that uses a non-compressed stranded wire for the inner conductor. Furthermore, it has been found that bending resistance is reduced in the coaxial cable of Experimental Example 2-7 that uses a single wire instead of a stranded wire for the inner conductor.

Experimental Example 3

The coaxial cables of Experimental Example 3-1 through Experimental Example 3-7 below were made and evaluated.

Experimental Examples 3-2 through 3-4 are examples according to the embodiment and Experimental Example 3-1 and Experimental Example 3-5 through Experimental Example 3-7 are comparative examples.

Experimental Example 3-1

A coaxial cable having the sectional shape as illustrated in FIG. 1 was made according to the following procedure.

(Inner Conductor 11)

A stranded wire into which seven element wires, which were annealed copper wires and 0.40 mm in element wire diameter, were stranded was prepared. This stranded wire was compressed into a compressed conductor serving as the inner conductor 11. At this point, the size of a die to pass through during compression was selected such that the compressibility had the value as illustrated in Table 3.

The inner conductor 11 has a configuration in which the six peripheral element wires 111B are placed around the single central element wire 111A. The same element wires are used for the central element wire and the peripheral element wires.

(Insulation 12)

The insulation 12 was placed on the outer periphery of the inner conductor 11. The insulation 12 includes the first insulation layer 121, the second insulation layer 122, and the third insulation layer 123. Unfoamed polyolefin was used as the first insulation layer 121 and the third insulation layer 123, and was cross-linked by being irradiated with an electron beam. Foamed polyolefin was used as the material of the second insulation layer 122, and was cross-linked by being irradiated with an electron beam. The thickness of the insulation 12 was adjusted such that the outside diameter D12 of the insulation 12 had the value as illustrated in Table 3.

(Outer Conductor 13)

Copper-coated polyester tape having a copper layer on a first principal surface of a polyester resin substrate and an adhesive layer on a second principal surface of the substrate on the side opposite from the first principal surface was bonded to the outer periphery of the insulation 12 with the adhesive layer to form the first outer conductor 131.

Tin-plated annealed copper wires were placed on the outer periphery of the first outer conductor 131 in such a manner as to form a braid structure to form the second outer conductor 132. As the second outer conductor 132, 16 units of tin-plated annealed copper wires of 0.08 mm in outside diameter, each unit having ten of them arranged in parallel, were employed to form a braided shield. In Table 3, with respect to the configuration of the second outer conductor, the number of units, the number of tin-plated annealed copper wires forming a single unit, and the outside diameter of the tin-plated annealed copper wires are written in this order in the row of "configuration."

(Sheath 14)

The sheath 14 of polyvinyl chloride (PVC) was formed on the outer periphery of the outer conductor 13 to manufacture the coaxial cable of this experimental example. In the table, polyvinyl chloride is expressed as PVC.

The obtained coaxial cable was evaluated as described above. The evaluation results are shown in Table 3.

Experimental Example 3-2 Through Experimental Example 3-5

The coaxial cables were manufactured and evaluated in the same manner as in the case of Experimental Example 3-1 except that the condition of compression for the inner conductor 11 was changed.

The evaluation results are shown in Table 3.

Experimental Example 3-6

As the inner conductor, a non-compressed stranded wire was used instead of a compressed conductor, and element wires of 0.32 mm in element wire diameter were used for the stranded wire. Furthermore, the foaming ratio of the second insulation layer 122 had the value as illustrated in Table 3.

Otherwise, the coaxial cable was manufactured and evaluated in the same manner as in the case of Experimental Example 3-1.

The evaluation results are shown in Table 3.

Experimental Example 3-7

As the inner conductor 11, a single-wire conductor of 1.05 mm in outside diameter was employed instead of a stranded wire. Otherwise, the coaxial cable was manufactured and evaluated in the same manner as in the case of Experimental Example 3-1.

The evaluation results are shown in Table 3.

TABLE 3

| | | | Exp. Ex. 3-1 | Exp. Ex. 3-2 | Exp. Ex. 3-3 |
|---|---|---|---|---|---|
| Inner conductor 11 | Material | — | Annealed copper wire (compressed conductor) | Annealed copper wire (compressed conductor) | Annealed copper wire (compressed conductor) |
| | Config. | No. | 7 | 7 | 7 |
| | OD D of central element wire | mm | 0.40 | 0.40 | 0.40 |
| | Compressibility | % | 15.0 | 20.0 | 27.8 |
| | OD D11 | mm | 1.106 | 1.07 | 1.02 |
| Insulation 12 | Material | — | Cross-linked foamed polyolefin | Cross-linked foamed polyolefin | Cross-linked foamed polyolefin |
| | Relative permittivity | — | 1.55 | 1.55 | 1.55 |
| | Foaming ratio | % | 56 | 56 | 56 |
| | Thickness | mm | 0.835 | 0.84 | 0.865 |
| | OD D12 | mm | 2.75 | 2.75 | 2.75 |
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/10/0.08 | 16/10/0.08 | 16/10/0.08 |
| | OD D13 | mm | 3.20 | 3.20 | 3.20 |
| Sheath 14 | Material | | PVC | PVC | PVC |
| | Thickness | mm | 0.30 | 0.30 | 0.30 |
| | OD D14 | mm | 3.8 | 3.8 | 3.8 |
| Charc. impedance | Measured value | Ω | 46.2 | 48.0 | 50.3 |
| | Evaluation | | B | A | A |
| Atten. | Measured value | dB/m | 1.30 | 1.29 | 1.27 |
| | Evaluation | | B | A | A |
| Bending resist. test | No. of times of bending | Times | — | 701 | 670 |
| | Evaluation | | — | A | A |
| Comprehensive evaluation | | | B | A | A |
| | | | Exp. Ex. 3-4 | Exp. Ex. 3-5 | Exp. Ex. 3-6 |
| Inner conductor 11 | Material | — | Annealed copper wire (compressed conductor) | Annealed copper wire (compressed conductor) | Annealed copper wire (stranded wire) |
| | Config. | No. | 7 | 7 | 7 |
| | OD D of central element wire | mm | 0.40 | 0.40 | 0.32 |
| | Compressibility | % | 32.0 | 33.3 | — |
| | OD D11 | mm | 0.99 | 0.98 | 0.96 |
| Insulation 12 | Material | — | Cross-linked foamed polyolefin | Cross-linked foamed polyolefin | Cross-linked foamed polyolefin |
| | Relative permittivity | — | 1.55 | 1.55 | 1.7 |

TABLE 3-continued

| | | | | | |
|---|---|---|---|---|---|
| | Foaming ratio | % | 56 | 57 | 51 |
| | Thickness | mm | 0.88 | 0.885 | 0.87 |
| | OD D12 | mm | 2.75 | 2.75 | 2.70 |
| 1st outer conductor 131 | Material | — | Copper-coated polyester tape (vertical attachment) | Copper-coated polyester tape (vertical attachment) | Copper-coated polyester tape (vertical attachment) |
| 2nd outer conductor 132 | Material | — | Tin-plated annealed copper wire braid | Tin-plated annealed copper wire braid | Tin-plated annealed copper wire braid |
| | Config. | Unit/no./mm | 16/10/0.08 | 16/10/0.08 | 16/10/0.08 |
| | OD D13 | mm | 3.20 | 3.20 | 3.20 |
| Sheath 14 | Material | — | PVC | PVC | PVC |
| | Thickness | mm | 0.30 | 0.30 | 0.30 |
| | OD D14 | mm | 3.8 | 3.8 | 3.8 |
| Charc. impedance | Measured value | Ω | 51.7 | 52.3 | 51.0 |
| | Evaluation | | A | B | A |
| Atten. | Measured value | dB/m | 1.26 | — | 1.34 |
| | Evaluation | | A | — | B |
| Bending resist. test | No. of times of bending | Times | 625 | — | 851 |
| | Evaluation | | A | — | A |
| Comprehensive evaluation | | | A | B | B |

| | | | Exp. Ex. 3-7 |
|---|---|---|---|
| Inner conductor 11 | Material | — | Annealed copper wire (single wire) |
| | Config. | No. | 1 |
| | OD D of central element wire | mm | 1.05 |
| | Compressibility | % | 1 |
| | OD D11 | mm | 1.05 |
| Insulation 12 | Material | — | Cross-linked foamed polyolefin |
| | Relative permittivity | — | 1.32 |
| | Foaming ratio | % | 77 |
| | Thickness | mm | 0.825 |
| | OD D12 | mm | 2.70 |
| 1st outer conductor 131 | Material | — | Copper-coated polyester tape (vertical attachment) |
| 2nd outer conductor 132 | Material | — | Tin-plated annealed copper wire braid |
| | Config. | Unit/no./mm | 16/10/0.08 |
| | OD D13 | mm | 3.20 |
| Sheath 14 | Material | — | PVC |
| | Thickness | mm | 0.30 |
| | OD D14 | mm | 3.8 |
| Charc. impedance | Measured value | Ω | 49.9 |
| | Evaluation | | A |
| Atten. | Measured value | dB/m | 1.065 |

TABLE 3-continued

| | | | |
|---|---|---|---|
| | | Evaluation | A |
| Bending resist. test | No. of times of bending | Times | 251 |
| | | Evaluation | B |
| | Comprehensive evaluation | | B |

From the evaluation results of Experimental Example 3-1 through Experimental Example 3-5, it has been found that the use of a compressed conductor that is a stranded wire whose compressibility is within a predetermined range for the inner conductor makes it possible to achieve a coaxial cable whose electrical characteristics, specifically, characteristic impedance and attenuation, are within predetermined ranges and that has good bending resistance.

In contrast, it has been found that attenuation is increased in the coaxial cable of Experimental Example 3-6 that uses a non-compressed stranded wire for the inner conductor. Furthermore, it has been found that bending resistance is reduced in the coaxial cable of Experimental Example 3-7 that uses a single wire instead of a stranded wire for the inner conductor.

DESCRIPTION OF THE REFERENCE NUMERALS

10 coaxial cable
11 inner conductor
11A circumscribed circle of inner conductor
D11 outside diameter of inner conductor
111 conductor element wire
111A central element wire
D outside diameter of central element wire
111B peripheral element wire
12 insulation
D12 outside diameter of insulation
121 first insulation layer
122 second insulation layer
123 third insulation layer
T121 film thickness of first insulation layer
T122 film thickness of second insulation layer
T123 film thickness of third insulation layer
13 outer conductor
D13 outside diameter of outer conductor
131 first outer conductor
132 second outer conductor
14 sheath
D14 outside diameter of sheath
21 stranded wire
21A circumscribed circle of stranded wire
211 conductor element wire
311, 312 mandrel

What is claimed is:

1. A coaxial cable comprising:
an inner conductor;
an insulation covering an outer periphery of the inner conductor;
an outer conductor covering an outer periphery of the insulation; and
a sheath covering an outer periphery of the outer conductor,
wherein the inner conductor is a compressed conductor including a central element wire and a plurality of peripheral element wires surrounding the central element wire,
the inner conductor has a compressibility of 23.0% or more and 35.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1 = n \times \pi \times 0.25 \times D^2 \quad \text{(A)}$$

$$\text{Compressibility} = [1 - S2/S1] \quad \text{(B), and}$$

an outside diameter of the insulation is 1.25 mm or more and less than 1.75 mm,
wherein the insulation includes, in order from a side of the inner conductor, a first insulation layer, a second insulation layer, and a third insulation layer,
a film thickness of the second insulation layer is greater than a film thickness of the first insulation layer and a film thickness of the third insulation layer,
the first insulation layer and the third insulation layer consist of unfoamed polyolefin, and the second insulation layer consists of foamed polyolefin,
the outside diameter D of the central element wire is smaller than the film thickness of the second insulation layer,
the central element wire and the peripheral element wires of the inner conductor are annealed copper wires,
the outer conductor includes a first outer conductor and a second outer conductor in order from a side of the insulation,
the first outer conductor is copper-coated polyester tape, and the second outer conductor is a braided shield of tin-plated annealed copper wires, and
an outside diameter of the tin-plated annealed copper wires is greater than the film thickness of the first insulation layer and smaller than the outside diameter D of the central element wire.

2. The coaxial cable as claimed in claim 1, wherein the insulation has a relative permittivity of 2.4 or less.

3. The coaxial cable as claimed in claim 1, wherein the outside diameter of the insulation is 1.72 to 1.75 mm.

4. The coaxial cable as claimed in claim 1, wherein the film thickness of the third insulation layer is greater than the film thickness of the first insulation layer and smaller than the outside diameter D of the central element wire.

5. The coaxial cable as claimed in claim 1, wherein a thickness of the sheath is greater than the outside diameter D of the central element wire and smaller than the outside diameter of the inner conductor.

6. A coaxial cable comprising:
an inner conductor;
an insulation covering an outer periphery of the inner conductor;
an outer conductor covering an outer periphery of the insulation; and
a sheath covering an outer periphery of the outer conductor, wherein the inner conductor is a compressed conductor including a central element wire and a plurality of peripheral element wires surrounding the central element wire, the inner conductor has a compressibility of 24.0% or more and 37.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1=n\times\pi\times0.25\times D^2 \quad \text{(A)}$$

$$\text{Compressibility}=[1-S2/S1] \quad \text{(B), and}$$

an outside diameter of the insulation is 1.75 mm or more and less than 2.25 mm, wherein a thickness of the insulation is smaller than an outside diameter of the inner conductor, wherein the insulation includes, in order from a side of the inner conductor, a first insulation layer, a second insulation layer, and a third insulation layer, a film thickness of the second insulation layer is greater than a film thickness of the first insulation layer and a film thickness of the third insulation layer, the first insulation layer and the third insulation layer consist of unfoamed polyolefin, and the second insulation layer consists of foamed polyolefin, the outside diameter D of the central element wire is smaller than the film thickness of the second insulation layer, the central element wire and the peripheral element wires of the inner conductor are annealed copper wires, the outer conductor includes a first outer conductor and a second outer conductor in order from a side of the insulation, the first outer conductor is copper-coated polyester tape, and the second outer conductor is a braided shield of tin-plated annealed copper wires, and wherein an outside diameter of the tin-plated annealed copper wires is greater than the film thickness of the first insulation layer and smaller than the outside diameter D of the central element wire.

7. The coaxial cable as claimed in claim 6, wherein the insulation has a relative permittivity of 2.4 or less.

8. A coaxial cable comprising:

an inner conductor;

an insulation covering an outer periphery of the inner conductor;

an outer conductor covering an outer periphery of the insulation; and a sheath covering an outer periphery of the outer conductor, wherein the inner conductor is a compressed conductor including a central element wire and a plurality of peripheral element wires surrounding the central element wire, the inner conductor has a compressibility of 20.0% or more and 33.0% or less in percentage, the compressibility being calculated from a sectional area S1 and a sectional area S2 of the compressed conductor, using Eq. (B) below, the sectional area S1 being calculated from an outside diameter D of the central element wire and a total number n of the central element wire and the peripheral element wires, using Eq. (A) below, $$S1=n\times\pi\times0.25\times D^2 \quad \text{(A)}$$

$$\text{Compressibility}=[1-S2/S1] \quad \text{(B), and}$$

an outside diameter of the insulation is 2.25 mm or more and 2.80 mm or less, wherein the insulation includes, in order from a side of the inner conductor, a first insulation layer, a second insulation layer, and a third insulation layer, a film thickness of the second insulation layer is greater than a film thickness of the first insulation layer and a film thickness of the third insulation layer, the first insulation layer and the third insulation layer consist of unfoamed polyolefin, and the second insulation layer consists of foamed polyolefin, and the outside diameter D of the central element wire is smaller than the film thickness of the second insulation layer, the central element wire and the peripheral element wires of the inner conductor are annealed copper wires, the outer conductor includes a first outer conductor and a second outer conductor in order from a side of the insulation, the first outer conductor is copper-coated polyester tape, and the second outer conductor is a braided shield of tin-plated annealed copper wires, wherein an outside diameter of the tin-plated annealed copper wires is greater than the film thickness of the first insulation layer and smaller than the outside diameter D of the central element wire.

9. The coaxial cable as claimed in claim 8, wherein the insulation has a relative permittivity of 2.4 or less.

10. The coaxial cable as claimed in claim 8, wherein the outside diameter of the insulation is 2.75 mm to 2.80 mm.

11. The coaxial cable as claimed in claim 8, wherein the film thickness of the third insulation layer is greater than the film thickness of the first insulation layer and smaller than the outside diameter D of the central element wire.

12. The coaxial cable as claimed in claim 8, wherein a thickness of the sheath is greater than the outside diameter D of the central element wire and smaller than an outside diameter of the inner conductor.

* * * * *